United States Patent
Zhang et al.

(10) Patent No.: US 11,060,742 B2
(45) Date of Patent: Jul. 13, 2021

(54) PVT HEAT PUMP SYSTEM CAPABLE OF ACHIEVING DAY-NIGHT TIME-SHARED COMBINED COOLING, HEATING AND POWER USING SOLAR RADIATION AND SKY COLD RADIATION

(71) Applicant: DALIAN UNIVERSITY OF TECHNOLOGY, Dalian (CN)

(72) Inventors: Jili Zhang, Dalian (CN); Ruobing Liang, Dalian (CN); Chao Zhou, Dalian (CN); Shixiang Lu, Dalian (CN); Jianquan Chen, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 309 days.

(21) Appl. No.: 16/342,441

(22) PCT Filed: Aug. 3, 2017

(86) PCT No.: PCT/CN2017/095905
§ 371 (c)(1),
(2) Date: Apr. 16, 2019

(87) PCT Pub. No.: WO2019/024061
PCT Pub. Date: Feb. 7, 2019

(65) Prior Publication Data
US 2020/0033013 A1 Jan. 30, 2020

(51) Int. Cl.
*F24F 5/00* (2006.01)
*H02S 40/32* (2014.01)
(Continued)

(52) U.S. Cl.
CPC .......... *F24F 5/0046* (2013.01); *F25B 29/003* (2013.01); *F25B 30/02* (2013.01);
(Continued)

(58) Field of Classification Search
CPC ............ F24F 5/0046; F24F 2005/0064; F24F 2005/0067; F24F 11/84; F25B 41/26;
(Continued)

(56) References Cited

U.S. PATENT DOCUMENTS 2,969,637 A * 1/1961 Rowekamp ........... F25B 27/002
60/641.8
3,782,132 A * 1/1974 Lohoff .................. F24F 5/0046
62/260
(Continued)

FOREIGN PATENT DOCUMENTS

| CN | 104748407 A | 7/2015 |
| CN | 105553418 A | 5/2016 |

(Continued)

*Primary Examiner* — Emmanuel E Duke
(74) *Attorney, Agent, or Firm* — Muncy, Geissler, Olds & Lowe, P.C.

(57) ABSTRACT

The present invention provides a photovoltaic and thermal (PVT) heat pump system capable of achieving day-night time-shared combined cooling, heating and power using solar radiation and sky cold radiation. The system utilizes a photovoltaic power generation technology and a photovoltaic and thermal (PVT) heat pump technology simultaneously, both of which are relatively independent and promoted to each other in the function. The main energy sources of the system are solar radiation energy and sky long-wave cold radiation energy, and the energy is respectively transformed into electric energy, thermal energy and cold energy via a photovoltaic and thermal (PVT) photoelectric-evaporation/condensation module at different times in different working modes. The system of the present invention integrates power generation. heating, refrigeration and many other functions; and the equipment has simple composition, high utilization rate and remarkable energy-saving effect, thereby improving the energy utilization rate to the maximum extent, and (Continued)

(FIG.1 as an illustration in Abstract)

achieving a multi-purpose machine and day-night time-shared combined cooling, heat and power.

2 Claims, 2 Drawing Sheets

(51) Int. Cl.
*H02S 40/38* (2014.01)
*H02S 40/44* (2014.01)
*F25B 29/00* (2006.01)
*F25B 30/02* (2006.01)
*F25B 41/26* (2021.01)

(52) U.S. Cl.
CPC .............. *F25B 41/26* (2021.01); *H02S 40/32* (2014.12); *H02S 40/38* (2014.12); *H02S 40/44* (2014.12); *F24F 2005/0064* (2013.01); *F24F 2005/0067* (2013.01)

(58) Field of Classification Search
CPC ...... F25B 29/003; F25B 30/02; F25B 27/005; F25B 13/00; H02S 40/32; H02S 40/38; H02S 40/44; Y02E 70/30; Y02E 10/60; Y02E 10/50
See application file for complete search history.

(56) References Cited

U.S. PATENT DOCUMENTS

| | | | | |
|---|---|---|---|---|
| 3,991,938 | A * | 11/1976 | Ramey | F24F 5/0046 |
| | | | | 126/611 |
| 4,248,049 | A * | 2/1981 | Briley | F24D 11/0221 |
| | | | | 62/235.1 |
| 4,607,132 | A * | 8/1986 | Jarnagin | H01L 31/0521 |
| | | | | 136/248 |
| 6,244,062 | B1 * | 6/2001 | Prado | F24S 80/50 |
| | | | | 62/235.1 |
| 8,096,293 | B2 * | 1/2012 | Hoellenriegel | F24D 11/0221 |
| | | | | 126/617 |
| 8,648,249 | B1 | 2/2014 | West | |
| 2002/0121298 | A1* | 9/2002 | Konold | F24S 23/31 |
| | | | | 136/248 |
| 2012/0125020 | A1* | 5/2012 | Vandermeulen | F24F 13/02 |
| | | | | 62/94 |

FOREIGN PATENT DOCUMENTS

| | | |
|---|---|---|
| CN | 206352597 A | 1/2017 |
| CN | 106524349 A | 3/2017 |
| CN | 106766357 A | 5/2017 |
| CN | 105071767 A | 11/2017 |
| CN | 107401855 | 11/2017 |
| CN | 207035564 U | 2/2018 |
| WO | WO 2011145034 A2 | 11/2011 |

* cited by examiner

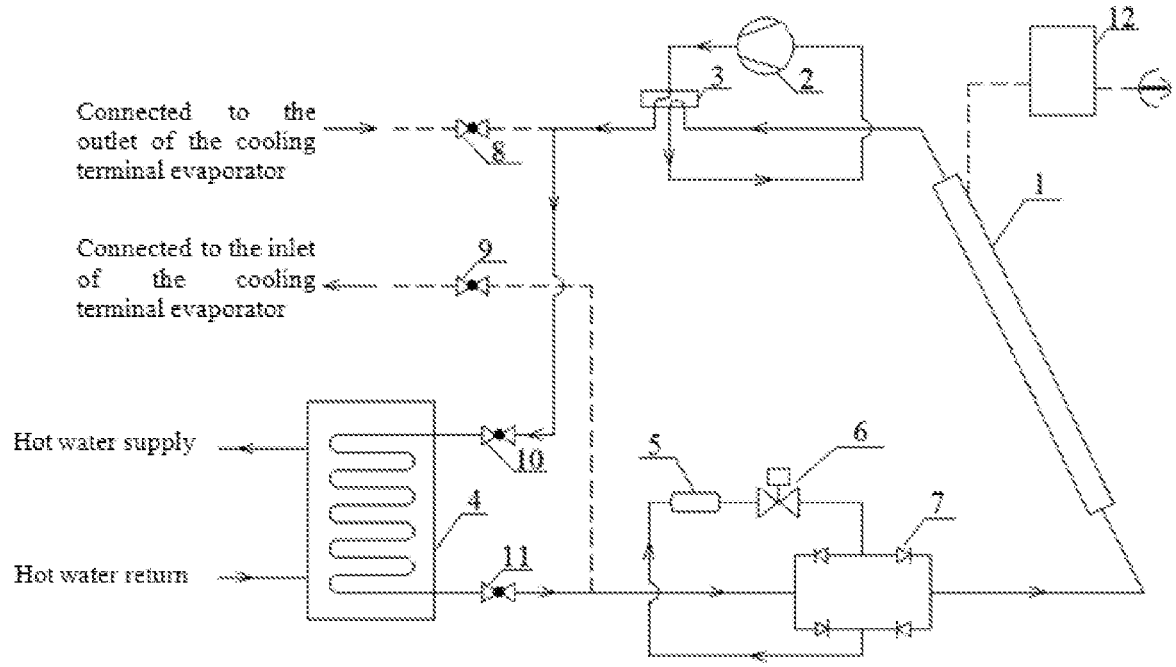
FIG. 1 (FIG.1 as an illustration in Abstract)
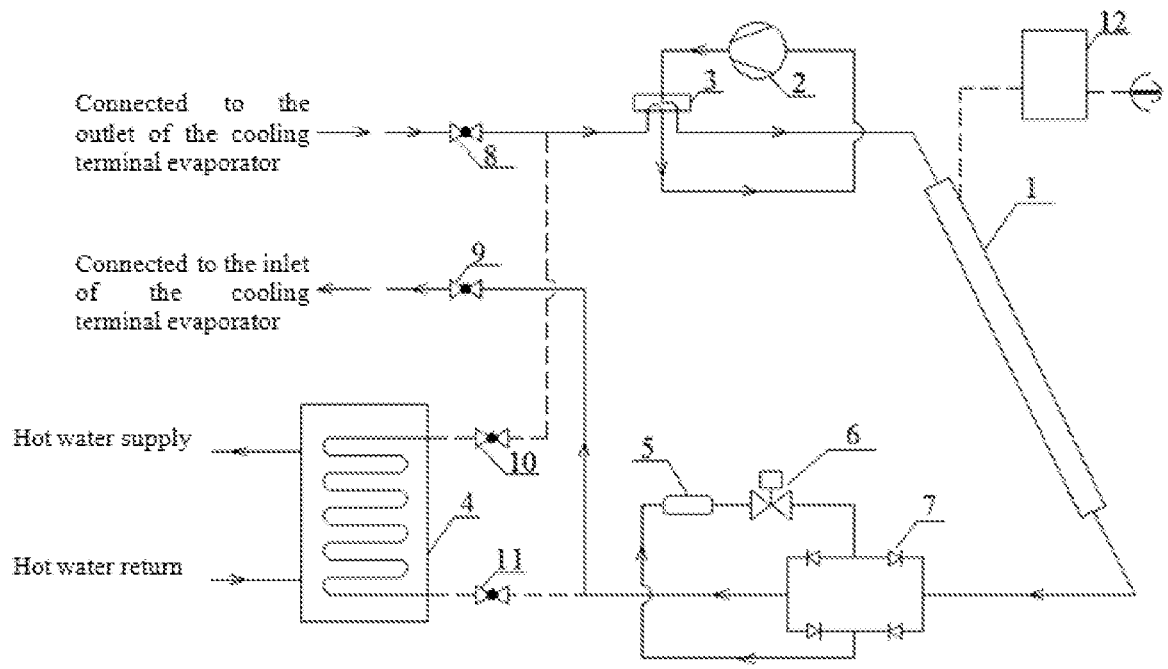
FIG. 2

PVT HEAT PUMP SYSTEM CAPABLE OF ACHIEVING DAY-NIGHT TIME-SHARED COMBINED COOLING, HEATING AND POWER USING SOLAR RADIATION AND SKY COLD RADIATION

TECHNICAL FIELD

The present invention relates to a PVT heat pump system achieving day-night time-shared combined cooling, heating and power by absorbing solar radiation and sky cold radiation with a solar photovoltaic power generation technology and a PVT heat pump technology.

BACKGROUND

Solar energy resources are new inexhaustible renewable energy. In view of current situations of increasingly exhausted fossil fuel resources and serious environmental pollution, the solar energy and other renewable energies become effective substitutes of the fossil fuel. Currently, solar energy photo-thermal utilization and photovoltaic utilization technologies have been relatively mature, and have been widely used in the fields of energy power, refrigeration and air-conditioning, social life and aerospace science and technology. But since the solar energy resource itself has low energy density, strong periodicity, poor stability and other disadvantages, many problems also exist for the utilization of the solar energy. The current bottleneck of the solar energy utilization is low utilization rate of solar energy resource and low utilization rate of solar energy system equipment, and the reason is not only related to the current development technology, but also related to the unicity of solar energy utilization.

To overcome the unicity of the solar energy resource utilization, predecessors have explored a solar PVT combined heating and power technology in the existing research results, and the solar PVT combined heating and power technology could achieve the output of thermal energy and electric energy using the solar radiation energy by day, but could not achieve the cold energy output when the cold energy is needed in summer, and could also not be operated around the clock. Therefore, the equipment utilization rate is low. Other studies show that, a direct-expansion solar heat pump air-conditioning and hot water system could achieve the combined operation of day and night, and outputs the thermal energy and air-conditioning refrigeration energy, but is switched in the assistance of an air-cooled heat exchanger and a valve. Therefore, the system is relatively complicated and has high control difficulty, and moreover, the system has no power generation function, and thus, could not output high-quality electric energy resources. A lot of additional electric energy should be inputted for the system operation, so that the performance coefficient of the system is not high, and the energy utilization rate is low. The common solar PVT module is mainly tube-sheet type; and in addition, a roll-bond module is mainly a double-sided roll-bond type. Although the double-sided roll-bond module has the low processing difficulty, the double-sided external protruding channel does not facilitate the lamination and combination with a photovoltaic module, which causes obstruction to the improvement of overall heating and power generation performance. A building is an environment for mankind to live. Energy demands for electric energy, thermal energy and cold energy are present at different times throughout the year, but the available space of the building itself is limited. Therefore, the key to improve the utilization rate of the system equipment and energy utilization rate is how to achieve the time-shared output of the three energies using the most simplified system in the minimum space occupation area.

The PVT heat pump system for day-night time-shared combined cooling, heating and power, which is an organic combination of the PVT heat pump technology and the solar photovoltaic power generation technology, could achieve the purpose of a multi-purpose machine for outputting the electric energy, the thermal energy and the cold energy on the same system at the different times in different working modes, and could improve the utilization rate of the energy to the maximum extent. The system is operated around the clock, thereby improving the equipment utilization rate and achieving the remarkable energy-saving effect. Therefore, it has a great practical value to invent a new PVT heat pump system having simple equipment composition, high energy utilization rate and high equipment utilization rate in the system and achieving the day-night time-shared combined cooling, heating and power as well as a PVT photoelectric-evaporation/condensation module.

SUMMARY

The present invention aims at providing a PVT heat pump system having high energy utilization rate, simple system composition and high equipment utilization rate, capable of achieving day-night time-shared combined cooling, heating and power using solar radiation and sky cold radiation, taking the solar radiation and sky long-wave cold radiation as main energy sources and utilizing a solar photovoltaic power generation technology and a PVT heat pump technology simultaneously, as well as a PVT photoelectric-evaporation/condensation module.

The present invention has technical solution that:

A PVT heat pump system capable of achieving day-night time-shared combined cooling, heating and power using solar radiation and sky cold radiation is provided. The system utilizes the photovoltaic power generation technology and the PVT heat pump technology simultaneously, both of which are relatively independent and promoted to each other in the function. The main energy sources of the system are solar radiation energy and sky long-wave cold radiation energy, and the energy transfer mode includes radiation and heat conduction, and the heat convection is supplemented, thereby achieving the output of electric energy, thermal energy and cold energy on the same system at different times in different working modes, and achieving a multi-purpose machine and day-night time-shared combined cooling heat and power.

The PVT heat pump system comprises a PVT photoelectric-evaporation/condensation module 1, a compressor 2, a four-way reversing valve 3, a heat storage water tank 4, a dry filter 5, an electronic expansion valve 6, a one-way refrigerant valve group 7 and a cooling terminal evaporator. With the control of the four-way reversing valve 3 and refrigerant solenoid valves 8-11, the switching of a heating/refrigeration mode of the heat pump is achieved; and a power system comprises an inverter 12 and a corresponding power distribution cabinet, a battery, etc.

When working in a combined heating and power mode by day with strong solar radiation intensity, the refrigerant in the PVT heat pump system is connected to an inlet of an efficient heat exchanger as a condenser of the heat pump system in the heat storage water tank 4 through the four-way reversing valve 3 after be exhausted by the compressor 2, and an outlet of the efficient heat exchanger is successively connected to the dry filter 5 and the electronic expansion valve 6 after passing through the one-way refrigerant valve group 7, and then, connected to an inlet of the PVT photoelectric-evaporation/condensation module 1 as an evaporator of the PVT heat pump system. A liquid refrigerant is evaporated through heat absorption in the PVT photoelectric-evaporation/condensation module 1; the volume thereof is gradually increased; a refrigerant channel is also gradually shunted along a pipeline, and shunted into a multi-pipe system from a two-pipe system; the refrigerant flows out from the outlet and is connected to a steam absorption opening of the compressor 2 through the four-way reversing valve 3, to form a closed heating cycle of the heat pump system. The inlet and the outlet of the efficient heat exchanger arranged in the heat storage water tank are respectively controlled by a third refrigerant solenoid valve 10 and a fourth refrigerant solenoid valve 11; and the efficient heat exchanger arranged in the heat storage water tank 4 directly heats the water in the heat storage water tank 4, and the water is taken as a heat source of heating or domestic hot water.

When working in the refrigeration mode in summer and a night of a transition season having a cold demand and by day of cloudy and rainy weather, the refrigerant in an outlet of the cooling terminal evaporator enters into the compressor 2 through the four-way reversing valve 3 for steam exhaust, and then, is connected to the inlet of the PVT photoelectric-evaporation/condensation module 1 as the condenser of the PVT heat pump system; gas refrigerant is condensed through heat release in the PVT photoelectric-evaporation/condensation module 1 from gas to the liquid; the volume is gradually reduced; the refrigerant channel is also converged to the two-pipe system from the multi-pipe system; and finally, the refrigerant flows out from the outlet, is successively connected to the dry filter 5 and the electronic expansion valve 6 after passing through the one-way refrigerant valve group 7, and enters into an inlet of the cooling terminal evaporator; the outlet and the inlet of the cooling terminal evaporator are respectively controlled by a first refrigerant solenoid valve 8 and a second refrigerant solenoid valve 9; and cold generated by the PVT heat pump system is transported to each cold area through each evaporator at the cooling terminal, and could also be transported to the cold areas having different cold demands in the different times through storage.

The one-way refrigerant valve group 7 is connected into a ring by four one-way valves, which is divided into two groups connected in opposite directions; and the dry filter 5 and the electronic expansion valve 6 are respectively connected between the two groups of one-way valves, to guarantee that the refrigerant always flows from the dry filter 5 to the electronic expansion valve 6.

The PVT photoelectric-evaporation/condensation module 1 is laminated by an efficient roll-bond heat exchange plate and a photovoltaic module. The heat exchange plate is made by single-sided inflatable processing of an all-aluminum plate, a flat plate is located on a top surface of the heat exchange plate, and the refrigerant channel is located on a bottom surface, is a serpentine coiled pipe channel, and is gradually shunted into the multi-pipe system from the two-pipe system of the inlet. Both a shunt position and a converging position are transited by a smooth pipeline, and three connectors, i.e. one inlet and two outlets, are arranged. To improve the anti-deformation strength of the heat exchange plate, the periphery of the heat exchange plate is made into an L-shaped downward edgefold, and the surface of the heat exchange plate is sprayed with a selective absorbing coating beneficial to enhancing the spectral absorption capability. The flat plate on the top surface is closely combined with the photovoltaic module through lamination more easily, thereby reducing the heat transfer resistance, increasing the heat conductivity, and improving the energy utilization rate. The photovoltaic module is a black photovoltaic backboard to enhance the spectral absorption capability and increase the heat conduction strength. An EVA glue film, as a viscous medium in a lamination process, is a thermosetting and viscous glue film, and placed between the photovoltaic module and the heat exchange plate. Due to the superiority of the EVA glue film in adhesive force, durability, optical characteristics and the like, the EVA glue film plays a role of adhesion and protection for the photovoltaic module, and also has high transparency, stability and insulativity.

The present invention has beneficial effects that:

1. The power, heating and cooling effects of the PVT heat pump system capable of achieving day-night time-shared combined cooling, heating and power using solar radiation and sky cold radiation are achieved on the PVT photoelectric-evaporation/condensation module. In winter, summer and the day having strong solar radiation intensity in the transition season, the system could work in the combined heating and power mode. At this time, the PVT photoelectric-evaporation/condensation module as the evaporator of the heat pump system absorbs heat. The module absorbs the solar radiation energy by day, wherein a part of energy is used for transforming the optical energy into the electric energy for output through a photovoltaic effect, and the other part of solar radiation energy is absorbed by the heat exchange plate at the lower layer of the module. In addition, the photovoltaic module emits heat to generate a lot of heat while generating power, and such heat is accumulated on the photovoltaic module to reduce the generating efficiency of the photovoltaic module. When the PVT photoelectric-evaporation/condensation module works in the combined heating and power mode, the heat of the photovoltaic module would be transferred to the lower heat exchange plate through heat conduction, and such heat is taken as the heat source of the heat pump system together with the solar radiation heat and the heat exchange quantity formed by natural convection between the heat exchange plate and air, and absorbed by the PVT photoelectric-evaporation/condensation module as the evaporator to produce hot water and store such water in the heat storage water tank, which could remarkably improve the generating efficiency of the photovoltaic module and achieve the efficient combined heating and power simultaneously. In summer and the night of the transition season having the cold demand, the system could work in the refrigeration mode, and the PVT photoelectric-evaporation/condensation module as the condenser of the heat pump system releases the heat. The module absorbs the long-wave cold radiation energy from sky, exchanges the heat with the sky and the air by taking the back of the module as the heat exchange plate of the condenser through the radiation heat transfer and natural convection heat transfer, produces the cold through a refrigerating cycle, and directly supplies the cold to the terminal evaporator in the cold area; and the produced cold could be directly used or stored. By day having weak solar radiation intensity in the cloudy and rainy weather of summer, the system could also work in the refrigeration mode. The module absorbs the sky long-wave cold radiation energy and the connective heat exchange quantity by washing the module surface by wind and rain, and produces the cold through the refrigerating cycle.

2. The PVT photoelectric-evaporation/condensation module is a module easily combined with a building to achieve the solar building integration, and has a flat plate type structure with simple and light structure and low cost. The module is not only applied to be obliquely installed on a pitched roof or a plane roof, but also is applied to be made into an architectural curtain wall for vertically hanging on an external wall of the building, thereby laying a foundation for achieving the transformation from an energy-intensive building to an energy-productive building, really achieving the solar building integration and the day-night time-shared combined cooling, heating and power, and laying a foundation for large-scale engineering application.

3. The PVT heat pump system capable of achieving day-night time-shared combined cooling, heating and power using solar radiation and sky cold radiation adopts the PVT heat pump technology, thereby greatly improving the efficiency of the module and the performance coefficient of the heat pump system. Through the heat pump cycle, the heat of the photovoltaic module in its generation process is taken away, thereby playing a role of cooling a photovoltaic battery piece, and remarkably improving the generating capacity and generating efficiency of the system. DC electric energy generated by the system is transformed into AC electric energy through the inverter and is directly supplied to the electricity load or incorporated into the state grid, and moreover, the electric energy could be stored in the battery for use at any time and any place. The whole system could achieve the self-sufficiency of the electric energy, the generating capacity of daytime is sufficient to supply the power consumption equipment in the system for using around the clock, and the surplus electric energy is stored or grid-connected.

4. The PVT heat pump system capable of achieving day-night time-shared combined cooling, heating and power using solar radiation and sky cold radiation integrates the heat supply, refrigeration, power generation and other functions. The system has simple equipment composition, high utilization rate of operation equipment around the clock and remarkable energy-saving effect, and could improve the energy utilization rate to the maximum extent, thereby achieving the day-night time-shared combined cooling, heating and power. The system is easily combined with the building to achieve the solar building integration, thereby meeting multiple energy demands of the building; the electric energy is self-sufficient, and the surplus generating capacity is grid-connected or stored; and the peak-valley price of city is facilitated, thereby achieving the electricity peak shifting. To sum up, with these advantages, the system is a green energy-saving and environment-friendly compound energy system having wide scope of application and great promotion value.

BRIEF DESCRIPTION OF THE DRAWINGS

FIG. 1 is a schematic diagram of systematic circulation of a heating mode of a PVT heat pump system capable of achieving day-night time-shared combined cooling, heating and power using solar radiation and sky cold radiation.

FIG. 2 is a schematic diagram of systematic circulation of a refrigeration mode of a PVT heat pump system capable of achieving day-night time-shared combined cooling, heating and power using solar radiation and sky cold radiation.

Figure 3:
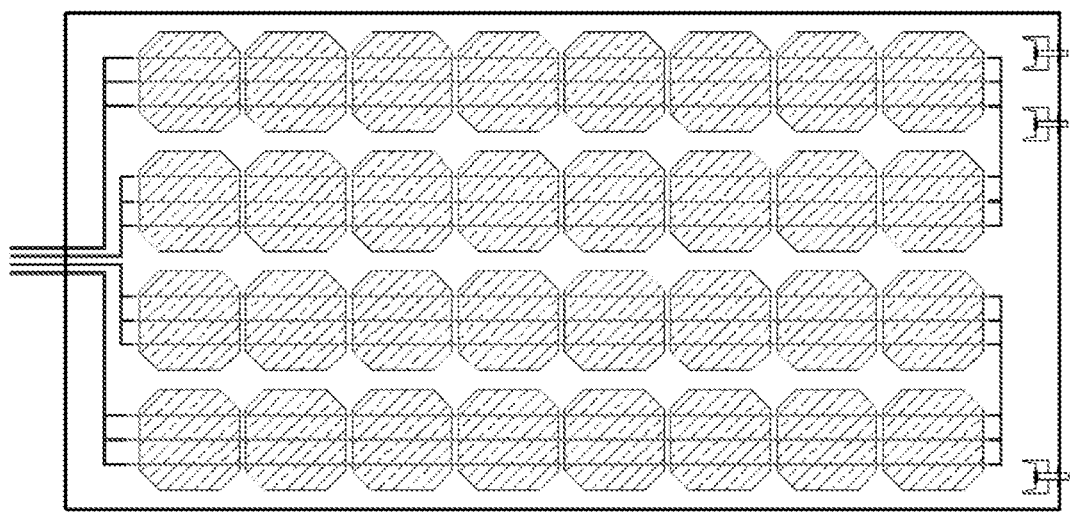
FIG. 3 is a diagram of a structural form of a PVT photoelectric-evaporation/condensation module.

In the figures: 1-PVT photoelectric-evaporation/condensation module; 2-Compresosr; 3-Four-way reversing valve; 4-Heat storage water tank; 5-Dry filter; 6-Electronic expansion valve; 7-One-way refrigerant valve group; 8-First refrigerant solenoid valve; 9-Second refrigerant solenoid valve; 10-Third refrigerant solenoid valve; 11-Fourth refrigerant solenoid valve; and 12-Photovoltaic inverter.

DETAILED DESCRIPTION

A PVT heat pump system capable of achieving day-night time-shared combined cooling, heating and power using solar radiation and sky cold radiation is provided. The system utilizes the photovoltaic power generation technology and the PVT heat pump technology simultaneously, both of which are relatively independent and promoted to each other in the function. The system can be operated around the clock. The main energy sources of the system are solar radiation energy and sky long-wave cold radiation energy, and the main energy transfer mode includes radiation and heat conduction, and the heat convection is supplemented, thereby achieving the output of electric energy, thermal energy and cold energy on the same system at different times in different working modes, and achieving a multi-purpose machine and day-night time-shared combined cooling heat and power.

The PVT heat pump system has simple equipment composition and simplified system form, and is mainly composed of a machine set, an outdoor machine and an indoor machine. The outdoor machine is a PVT photoelectric-evaporation/condensation module 1 which acts as an evaporator and a condenser of the PVT heat pump system and is also equipment that generates power using a photovoltaic effect by day; the machine set is mainly composed of a compressor 2, a four-way reversing valve 3, a dry filter 5, an electronic expansion valve 6 and a one-way refrigerant valve group 7; and the indoor machine has many forms, includes a heat storage water tank 4 for heat utilization and a cold equipment evaporator used for ends, and can be used for direct cold supply as well as cold storage and supply of different time periods. With the control of the four-way reversing valve 3 and refrigerant solenoid valves 8-11, the switching of a heating/refrigeration mode of the heat pump is achieved; and a power system is composed of an inverter, a power distribution cabinet, a battery and the like.

As shown in FIG. 1, in winter, summer and the day having strong solar radiation intensity in the transition season, the system could work in the combined heating and power mode. At this time, the PVT photoelectric-evaporation/condensation module as the evaporator of the PVT heat pump system absorbs heat. The absorbed heat mainly includes solar radiation energy, heat conduction quality to a heat exchange plate through heating of the photoelectric module, and heat exchange quantity formed by natural convection between the heat exchange plate and air. The refrigerant in the PVT heat pump system is connected to an inlet of an efficient heat exchanger as a condenser of the heat pump system in the heat storage water tank 4 through the four-way reversing valve 3 after be exhausted by the compressor 2, and an outlet of the efficient heat exchanger is successively connected to the dry filter 5 and the electronic expansion valve 6 after passing through the one-way refrigerant valve group 7, and then, connected to an inlet of the PVT photoelectric-evaporation/condensation module 1. A liquid refrigerant is evaporated through heat absorption in the PVT photoelectric-evaporation/condensation module 1; the volume thereof is gradually increased; a refrigerant channel is also gradually shunted along a pipeline, and shunted into a multi-pipe system from a two-pipe system; the refrigerant flows out from the outlet and is connected to a steam absorption opening of the compressor 2 through the four-way reversing valve 3, to form a closed heating cycle of the heat pump system. The inlet and the outlet of the efficient heat exchanger are respectively controlled by a third refrigerant solenoid valve 10 and a fourth refrigerant solenoid valve 11; and the efficient heat exchanger arranged in the heat storage water tank 4 directly heats the water in the heat storage water tank 4, and the water is taken as a heat source of heating or domestic hot water.

As shown in FIG. 2, in summer and a night of a transition season having a cold demand and by day of cloudy and rainy weather with low solar radiation intensity, the system could work in the refrigeration mode, and the PVT photoelectric-evaporation/condensation module as the condenser of the heat pump system releases the heat. Heat exchange energy sources mainly include sky long-wave cold radiation energy, and heat exchange quantity formed by natural convection between the heat exchange plate and air and wind and washing. The refrigerant in an outlet of the cooling terminal evaporator enters into the compressor 2 through the four-way reversing valve 3 for steam exhaust, and then, is connected to the inlet of the PVT photoelectric-evaporation/condensation module 1; gas refrigerant is condensed through heat release in the PVT photoelectric-evaporation/condensation module 1 from gas to the liquid; the volume is gradually reduced; the refrigerant channel is also converged to the two-pipe system from the multi-pipe system; and finally, the refrigerant flows out from the outlet, is successively connected to the dry filter 5 and the electronic expansion valve 6 after passing through the one-way refrigerant valve group 7, and enters into an inlet of the cooling terminal evaporator; the outlet and the inlet of the cooling terminal evaporator are respectively controlled by a first refrigerant solenoid valve 8 and a second refrigerant solenoid valve 9; and cold generated by the PVT heat pump system is transported to each cold area through each evaporator at the cooling terminal, and could also be transported to the cold areas having different cold demands in the different times through storage.

The one-way refrigerant valve group 7 is connected into a ring by four one-way valves, which is divided into two groups connected in opposite directions; and the dry filter 5 and the electronic expansion valve 6 are respectively connected between the two groups of one-way valves, to guarantee that the refrigerant always flows from the dry filter 5 to the electronic expansion valve 6.

The PVT photoelectric-evaporation/condensation module 1 is laminated by an efficient roll-bond heat exchange plate and a photovoltaic module. The heat exchange plate is made by single-sided inflatable processing of an all-aluminum plate, a flat plate is located on a top surface of the heat exchange plate, and the refrigerant channel is located on a bottom surface, is a serpentine coiled pipe channel, and is gradually shunted into the multi-pipe system from the two-pipe system of the inlet. Both a shunt position and a converging position are transited by a smooth pipeline, and three connectors, i.e. one inlet and two outlets, are arranged. To improve the anti-deformation strength of the heat exchange plate, the periphery of the heat exchange plate is made into an L-shaped downward edgefold, and the surface of the heat exchange plate is sprayed with a selective absorbing coating beneficial to enhancing the spectral absorption capability. The inflatable technology needs the technologies of drawing channel form diagrams, welding, hot rolling, cold rolling and annealing, and finally integral blowing is required with nitrogen. This process ensures that one side is flat and the other side is protruded outwards. The pipeline is blown into a semicircular channel. The flat plate on the top surface is closely combined with the photovoltaic module through lamination more easily, thereby reducing the heat transfer resistance, increasing the heat conductivity, and improving the energy utilization rate. The photovoltaic module is a black photovoltaic backboard to enhance the spectral absorption capability and increase the heat conduction strength. An EVA glue film, as a viscous medium, is placed between the photovoltaic module and the heat exchange plate.

The PVT heat pump system capable of achieving day-night time-shared combined cooling, heating and power using solar radiation and sky cold radiation adopts the PVT heat pump system, thereby greatly improving the efficiency of the module and the performance coefficient of the heat pump system. Through the heat pump cycle, the heat of the photovoltaic module in its generation process is taken away, thereby playing a role of cooling a photovoltaic battery piece, and remarkably improving the generating capacity and generating efficiency of the system. Two systems are promoted to each other. The whole system could achieve the self-sufficiency of the electric energy, the generating capacity of daytime is sufficient to supply the power consumption equipment in the system for using around the clock.

The PVT heat pump system capable of achieving day-night time-shared combined cooling, heating and power using solar radiation and sky cold radiation integrates the heat supply, refrigeration, power generation and other functions. The system has simple equipment composition, high utilization rate of operation equipment around the clock and remarkable energy-saving effect, and could improve the energy utilization rate to the maximum extent, thereby achieving the day-night time-shared combined cooling, heating and power. The system is a green energy-saving and environment-friendly compound energy system having wide scope of application and great promotion value.

We claim:

1. A photovoltic and thermal (PVT) heat pump system capable of achieving day-night time-shared combined cooling, heating and power using solar radiation and sky cold radiation, utilizing a photovoltaic power generation technology and a PVT heat pump technology simultaneously, both of which are relatively independent and promoted to each other in the function, the main energy sources of the systems are solar radiation energy and sky long-wave cold radiation energy, and the energy transfer mode includes radiation and heat conduction, and the heat convection is supplemented, thereby achieving the output of electric energy, thermal energy and cold energy on the same system at different times in different working modes, and achieving a multi-purpose machine and day-night time-shared combined cooling heat and power, wherein the PVT heat pump system comprises a PVT photoelectric-evaporation/condensation module, a compressor, a four-way reversing valve, a heat storage water tank, a dry filter, an electronic expansion valve, a one-way refrigerant valve group and a cooling terminal evaporator; with the control of the four-way reversing valve and refrigerant solenoid valves, the switching of a heating/refrigeration mode of the heat pump is achieved; and a power system comprises an inverter;

when working in a combined heating and power mode by day with strong solar radiation intensity, the refrigerant in the PVT heat pump system is connected to an inlet of an efficient heat exchanger as a condenser of the heat pump system in the heat storage water tank through the four-way reversing valve after be exhausted by the compressor, and an outlet of the efficient heat exchanger is successively connected to the dry filter and the electronic expansion valve after passing through the one-way refrigerant valve group and then, connected to an inlet of the PVT photoelectric-evaporation/condensation module as an evaporator of the PVT heat pump system; a liquid refrigerant is evaporated through heat absorption in the PVT photoelectric-evaporation/condensation module; the volume thereof is gradually increased; a refrigerant channel is also gradually shunted along a pipeline, and shunted into a multi-pipe system from a two-pipe system; the refrigerant flows out from the outlet and is connected to a steam absorption opening of the compressor through the four-way reversing valve, to form a closed heating cycle of the heat pump system; the inlet and the outlet of the efficient heat exchanger arranged in the heat storage water tank are respectively controlled by a third refrigerant solenoid valve and a fourth refrigerant solenoid valve; and the efficient heat exchanger arranged in the heat storage water tank directly heats the water in the heat storage water tank, and the water is taken as a heat source of heating or domestic hot water; and when working in the refrigeration mode in summer and a night of a transition season having a cold demand and by day of cloudy and rainy weather, the refrigerant in an outlet of the cooling terminal evaporator enters into the compressor through the four-way reversing valve for steam exhaust, and then, is connected to the inlet of the PVT photoelectric-evaporation/condensation module as the condenser of the PVT heat pump system; gas refrigerant is condensed through heat release in the PVT photoelectric-evaporation/condensation module from gas to the liquid; the volume is gradually reduced; the refrigerant channel is also converged to the two-pipe system from the multi-pipe system; and finally, the refrigerant flows out from the outlet, is successively connected to the dry filter and the electronic expansion valve after passing through the one-way refrigerant valve group, and enters into an inlet of the cooling terminal evaporator; the outlet and the inlet of the cooling terminal evaporator are respectively controlled by a first refrigerant solenoid valve and a second refrigerant solenoid valve; and cold generated by the PVT heat pump system is transported to each cold area through each evaporator at the cooling terminal, or is transported to the cold areas having different cold demands in the different times through storage.

2. The PVT heat pump system capable of achieving day-night time-shared combined cooling, heating and power using solar radiation and sky cold radiation according to claim 1, wherein the one-way refrigerant valve group is connected into a ring by four one-way valves, which is divided into two groups connected in opposite directions; and the dry filter and the electronic expansion valve are respectively connected between the two groups of one-way valves, to guarantee that the refrigerant always flows from the dry filter to the electronic expansion valve.

* * * * *